No. 748,865.                                                    Patented January 5, 1904.

UNITED STATES PATENT OFFICE.

EDWARD R. HEWITT, OF GARDEN CITY, NEW YORK.

METHOD OF CLARIFYING LIQUORS.

SPECIFICATION forming part of Letters Patent No. 748,865, dated January 5, 1904.

Application filed March 3, 1902. Serial No. 96,558. (No specimens.)

*To all whom it may concern:*

Be it known that I, EDWARD R. HEWITT, a citizen of the United States, and a resident of Garden City, county of Queens, Long Island, in the State of New York, have invented certain new and useful Improvements in the Art of Clarifying Liquors, of which the following is a specification.

This invention relates to a novel process for clarifying any liquors or liquids having in suspension impurities in a finely-divided state. This process can be used to clarify any such liquors, including beer, wine, glue solutions from hide stock, &c., and, in fact, any organic or aqueous solution; but it is especially useful in the clarification of solutions of glue obtained by dissolving bones.

When impurities are held in suspension in a very finely-divided state in liquors of any kind, so that they constitute a slimy rather than a granular precipitate, it is very difficult to mechanically separate such impurities in order to obtain a clear liquor.

The object of this invention is to obtain in such solutions or liquors a precipitate which will retain and carry down all the impurities in such a heavy form that the subsequent mechanical separation may readily be made complete and perfect. It is especially important in glue-making, for example, that the glue liquor should be absolutely clear and free from impurities, which would otherwise crystallize in the dried glue and impair its quality.

The invention consists in adding to any such impure or muddy liquor a solution which contains two acid salts of bones which can combine with one or more bases to form on precipitation a granular double salt which will retain all the impurities held in suspension in the liquor. Such a reagent is most readily produced by employing aqueous solutions of sulfurous acid in separating the gelatin from bones in accordance with the method disclosed in my application for patent, Serial No. 97,138, filed March 7, 1902; but the bone salts may be produced in any other desired way.

Although the invention may be practiced upon any organic or aqueous solution requiring clarification, it will be described with respect to crude glue liquor, wherein it is particularly useful.

The invention is applicable not only to the manufacture of glue from bones by means of aqueous solutions of sulfurous acid, but in the manufacture of glue from bones by any other process, and the manufacture of glue from any raw stock other than bones, and the manufacture of any other product which results in a liquor having fine particles of impurities held in suspension. The clarification of any other liquors, such as wine or beer, by my process requires no substantially different treatment from that required in the clarification of glue solution, the important feature common to all cases being my discovery that if a solution containing two acid salts, substantially as described, be added to such muddy liquor and the resulting liquor be then neutralized a precipitate will be formed which is readily separable from the liquor, which precipitate will carry with it all the other impurities in the liquor. It is my intention, therefore, that the claims shall cover my method without respect to its use in clarifying any particular liquor.

I have discovered that if some of the aqueous solutions of sulfurous acid which have been used to extract the lime salts from bones is put into the liquor which requires clarifying the calcium phosphate and calcium sulfite in the solution will by neutralization be precipitated as a double salt in granular form, so that they can be readily separated in a filter-press or other separating device. In the case of a glue liquor this treatment will not injure the quality of the glue in the least, although the addition of a clear acid solution without the lime salts would do so. This aqueous acid solution I prefer to add to the glue liquor after a suitable base (such as the alkaline earths of barium, strontium, calcium, magnesium, or other more rare earths) has been added to the latter until it tests neutral. This results in the formation of a fine precipitate of lime salts contained in the small amount of sulfurous acid which passed into the glue solution when the glue was rendered from the bone cartilage from which most of the lime salts have been extracted by the sulfurous acid. The clarifying solution might be added to the glue liquor before any neutralization; but it would then be impossible to determine exactly how much of clarifying solution was required, whereas after the neutralization of the glue liquor the character of the resulting precipitate will indicate substantially the amount of acid solution which is required. In the case of a non-acid liquor, where the particles are already in suspension, it is not of course necessary to first neutralize. The addition of the acid-clarifying solution of course makes the liquid to be clarified acid again, and it should then be neutralized in order to obtain the desired granular precipitate. I have found that the addition of a fresh solution of acid without the salts to the glue liquor will cause the formation of a precipitate too fine to deposit in the filter-press and, furthermore, that the addition of such a fresh solution is liable to impair the quality of the glue. The formation of the granular precipitate is caused, I believe, by the presence in the clarifying solution of the calcium phosphate and sulfite. As soon as the clarifying solution is added to the glue liquor or any other liquor I believe there is a formation of a double salt, which leaves the liquor perfectly clear when this salt is precipitated by the addition of a suitable base. The amount of this clarifying solution which it is necessary to use in order to obtain the granular precipitate in the liquor is dependent upon the amount and structure of the impurities held in suspension in a given liquor, and the solution is simply added until the granular precipitate is formed, which result is evident upon inspection. Since the amount of clarifying solution used is dependent upon varying conditions in the different liquors to be clarified, this amount cannot be specified, as no more exact directions are necessary to the successful execution of the process by one skilled in the art than that of simply adding the solution until the desired result is attained. Also the composition of the clarifying solution is dependent upon the character of the bones operated upon and upon the strength and amount of acid solution which is used on the bones. I have obtained good results with a two-per-cent. aqueous-acid solution saturated with about two per cent. of calcium phosphate and calcium sulfite extracted from the bones. In different cases I have found that to produce the desired results it is advisable to employ an amount of clarifying solution equivalent by volume to three to ten (about five) per cent. of the liquor to be clarified; but these proportions may obviously vary within wide limits in different cases.

When the precipitate formed in the manner described happens to be too fine, owing to an insufficiency of the two salts in the clarifying solution, a little more of the clarifying solution may be added to the liquor after the neutralization with a base, thus making the liquor acid again and increasing the amount of the two salts already therein, so that when the liquor is neutralized the second time a better and larger precipitate will be obtained, which will be of such character that it will separate all other impurities from the liquor. If, however, the precipitate is still unsatisfactory after the second neutralization, the liquor can again be made acid and have still more of the two salts added to it, so that when finally neutralized the salts will combine in the desired way. Liquors other than glue solutions do not usually contain the two salts required and are usually not acid, so that when it is desired to clarify such liquors by this process it is necessary to add to them the total amount of acid salts required by the addition of the clarifying solution and then the liquor is neutralized, whereby the salts will be obtained and precipitated in granular form, having also the characteristic of being able to carry with them all the other impurities in the liquor to be clarified.

The best mode of executing the invention in practice under average conditions may be described as follows: To the glue solution should be added a clarifying solution of about five per cent., by volume, of the glue solution, the clarifying solution consisting of an aqueous solution containing two per cent. of sulfurous acid, which aqueous solution has been saturated by its action on bones with two per cent. of its volume of the bone salts. In case exact data are not known the glue solution should be neutralized before the clarifying solution is added in order to obtain a guide in the resulting precipitate as to the amount of clarifying solution which is required. In glue solutions resulting from rendering bone cartilage from which the lime salts have been extracted by aqueous solutions or sulfurous acid there is necessarily present some of the sulfurous acid containing the lime salts, and to such glue solutions it is not necessary to add as large a proportion of the clarifying solution as in the case of other liquors which are to be clarified. In any such case the proper amount of clarifying solution required can be readily determined by trial. To obtain the desired precipitate, the liquor is then neutralized by the addition of a suitable base, as described above.

An important advantage of the invention is that the clarifying agent is obtained at a minimum cost, since ninety-eight per cent. of it comprises water and bone salts, which are substantially waste products of the process of separating gelatin from animal bones, which process may be executed in accordance with the invention described in my application for patent, Serial No. 97,138, filed March 7, 1902, or in any other suitable manner. The small percentage of acid is of trifling cost.

The particular advantage of the invention for glue-making is that the clarifying solution is an insignificant portion of the byproduct obtained in the steps of the glue-making process which result in the glue solution requiring clarification.

I claim—

1. The method of clarifying liquors which are acid in character, which consists in first adding a suitable base, to neutralize and thereby form a fine precipitate, next adding an aqueous solution of sulfurous acid and the lime salts of bones, and then again neutralizing to form a more readily separable precipitate.

2. The method of clarifying glue solutions containing sulfurous acid and some lime salts of bones, which consists in adding a suitable base to neutralize and thereby form a fine precipitate, next adding an aqueous solution of sulfurous acid and the lime salts of bones, and then again neutralizing to form a more readily separable precipitate.

3. The method of clarifying glue solutions containing some of the acid reagent employed in obtaining such solutions, which consists in first adding a suitable base, to neutralize and thereby form a fine precipitate, next adding an aqueous solution of sulfurous acid and the lime salts of bones, and then again neutralizing to form a more readily separable precipitate.

EDWARD R. HEWITT.

Witnesses:
JAMES J. COSGROVE,
W. H. BERRIGAN.